United States Patent
Kuze

(10) Patent No.: US 7,077,180 B2
(45) Date of Patent: Jul. 18, 2006

(54) PNEUMATIC TIRE HAVING SIPES FORMED BY SHIFTING PITCHES OF ZIGZAG SHAPE

(75) Inventor: Tetsuya Kuze, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 691 days.

(21) Appl. No.: 10/113,567

(22) Filed: Apr. 2, 2002

(65) Prior Publication Data

US 2002/0170643 A1 Nov. 21, 2002

(30) Foreign Application Priority Data

Apr. 5, 2001 (JP) ............................. 2001-107334

(51) Int. Cl.
*B60C 11/11* (2006.01)
*B60C 11/12* (2006.01)

(52) U.S. Cl. ...................... 152/209.18; 152/209.21; 152/209.23; 152/902; 152/DIG. 3

(58) Field of Classification Search ........... 152/209.18, 152/209.21, 209.23, DIG. 3, 902
See application file for complete search history.

(56) References Cited

U.S. PATENT DOCUMENTS 4,566,514 A * 1/1986 Mauk et al. ........... 152/209.23

6,427,737 B1 * 8/2002 Katayama .............. 152/209.21
6,719,024 B1 * 4/2004 Kuze ..................... 152/DIG. 3
2002/0053383 A1 * 5/2002 Kleinhoff et al. ...... 152/209.18

FOREIGN PATENT DOCUMENTS

JP          6-48123       *  2/1994

* cited by examiner

*Primary Examiner*—Steven D. Maki
(74) *Attorney, Agent, or Firm*—Rader, Fishman & Grauer PLLC

(57) ABSTRACT

Disclosed is a pneumatic tire provided with multiple blocks 6 on a tread 1. A sipe 7 provided on the block 6 is formed by shifting pitches of a zigzag shape 7a on a tread face 1a side of the sipe and a zigzag shape 7b on a bottom side thereof in the width direction of the tire, and by connecting concave and convex flexion points a, a', b and b' on the both of the zigzag shapes with edge lines x1, x2 and x3. The block 6 is sectioned by the sipe 7 into a concavo-convex face A in which convex triangular pyramids Aa and convex reverse triangular pyramids Ab are alternately arranged, and a concavo-convex face B in which concave triangular pyramids Ba and concave reverse triangular pyramids Bb are alternately arranged. The concavo-convex faces A sectioned by the sipes are at least disposed in both outermost positions in the circumferential direction of the block in a manner that the concavo-convex faces A are oriented outward from the block.

4 Claims, 5 Drawing Sheets

(a)

(b)

(c)

(d)

(e)

(f)

(g)

(h)

PNEUMATIC TIRE HAVING SIPES FORMED BY SHIFTING PITCHES OF ZIGZAG SHAPE

BACKGROUND OF THE INVENTION

The present invention relates to a pneumatic tire, more specifically, to a pneumatic tire arranged to enhance on-ice performances on snowy and icy roads without degrading driving stability as on dry roads and to suppress occurrence of uneven wear thereof.

Generally, a pneumatic tire to be used on snowy and icy roads has a constitution that multiple blocks are partitioned and formed on a tread face by main grooves extending in a circumferential direction of the tire and by sub grooves extending in a width direction of the tire, in which multiple sipes are further provided on treads of the blocks. The pneumatic tire is designed to secure driving and braking performances on snowy and icy roads (hereinafter referred to as "on-ice performances") owing to scratching actions onto the snowy and icy roads by edges at both front and back ends of these blocks as well as edges of the sipes (such actions will be hereinafter referred to as an "edge effect").

If the number of the sipes is increased in order to further enhance the on-ice performances of the above-described pneumatic tire, contactability of the tire is degraded because shear rigidity of the blocks are reduced. Accordingly, such an increase in the number of sipes cannot enhance the on-ice performances significantly, and, if anything, uneven wear tends to be more prominent by the increase. Various modes have been proposed in the past as countermeasures for the foregoing problems. The countermeasures proposed in the past attempted to enhance the shear rigidity of the blocks by forming wall surfaces of the sipes into concave and convex shapes so that the wall surfaces are engaged with one another, or by reducing widths (or thicknesses) of the sipes.

However, those countermeasures by means of increasing engagement between the concave and convex shapes of the wall surfaces of the sipes or reducing the widths (or thicknesses) of the sipes had problems such as degradation of releaseability upon releasing a tire from a mold after curing, or breakage of sipe-forming blades due to lack of strength caused by thinning.

SUMMARY OF THE INVENTION

An object of the present invention is to provide a pneumatic tire which enhances on-ice performances on snowy and icy roads without degrading driving stability as on dry roads and suppresses occurrence of uneven wear thereof. Another object of the present invention is to provide a pneumatic tire arranged to enhance releaseability of the tire from a mold after curing, whereby durability of the mold is enhanced.

To attain the foregoing objects, a pneumatic tire of the present invention has a constitution of multiple blocks formed on a tread face by a plurality of main grooves extending in a circumferential direction of the tire and by a plurality of sub grooves intersecting the main grooves, in which zigzag sipes extending in a width direction of the tire are provided on surfaces of the blocks. Here, the pneumatic tire is characterized in that: the sipes are formed by shifting pitches of a zigzag shape on a tread face side of the sipe and a zigzag shape on a bottom side thereof in the width direction of the tire, and in the case of viewing concave and convex points according to a visual direction E along the circumferential direction of the tire, by connecting a convex flexion point of the zigzag shape on the tread side and a concave flexion point of the zigzag shape on the bottom side which are facing each other, a concave flexion point of the zigzag shape on the tread side and a convex flexion point of the zigzag shape on the bottom side which are facing each other, and the concave points of the both zigzag shapes which are adjacent to each other, severally with edge lines, and by interlinking the edge lines serially by planes in the width direction of the tire; one of wall surfaces sectioned by the sipe is formed into a concavo-convex face A in which convex triangular pyramids and convex reverse triangular pyramids are alternately arranged in the width direction of the tire, and the other wall surface is formed into a concavo-convex face B in which concave triangular pyramids and concave reverse triangular pyramids are alternately arranged in the width direction of the tire; and the concavo-convex faces A sectioned by the sipes are at least disposed in both outermost positions in the circumferential direction of the block in a manner that the concavo-convex faces A are oriented outward from the block.

By specifying the shape of the sipe as described above, one of the wall surfaces sectioned by the sipe is formed into the concavo-convex face A in which convex triangular pyramids and convex reverse triangular pyramids are alternately arranged in the width direction of the tire. Moreover, since the concavo-convex faces A are at least disposed in the both outermost positions in the circumferential direction of the block in the manner that the concavo-convex faces A are oriented outward from the block, it is possible to enhance the edge effect because flexural rigidity against shearing force applied to an end portion of the block is enhanced upon driving and braking. Therefore, it is possible to enhance on-ice performances on snowy and icy roads without degrading driving stability as on dry roads and to suppress occurrence of uneven wear of the tire.

In addition, since the wall surfaces of the sipes have the above-described structure, it is possible to impart high flexural rigidity to sipe-forming blades of the mold even if the sipe-forming blades are thinned, whereby breakage of the sipe-forming blades can be reduced upon releasing the tire from the mold after curing.

DESCRIPTION OF THE PREFERRED EMBODIMENTS

Figure 1A:
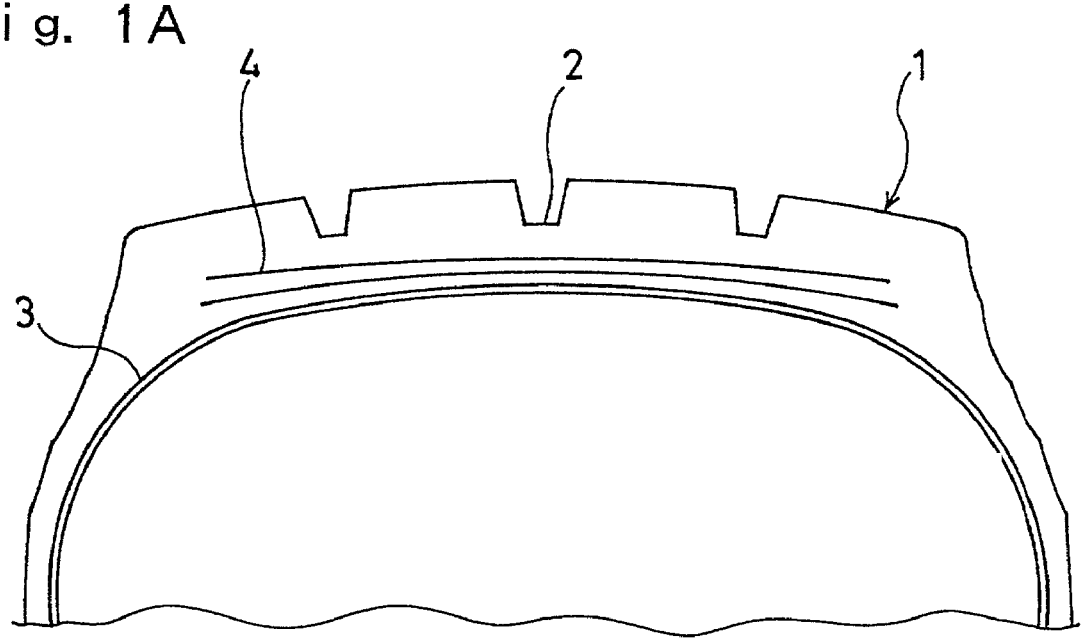
FIG. 1A is a cross-sectional view of a tread portion of a pneumatic tire according to an embodiment of the present invention, taken along a meridian direction thereof.
Figure 1B:
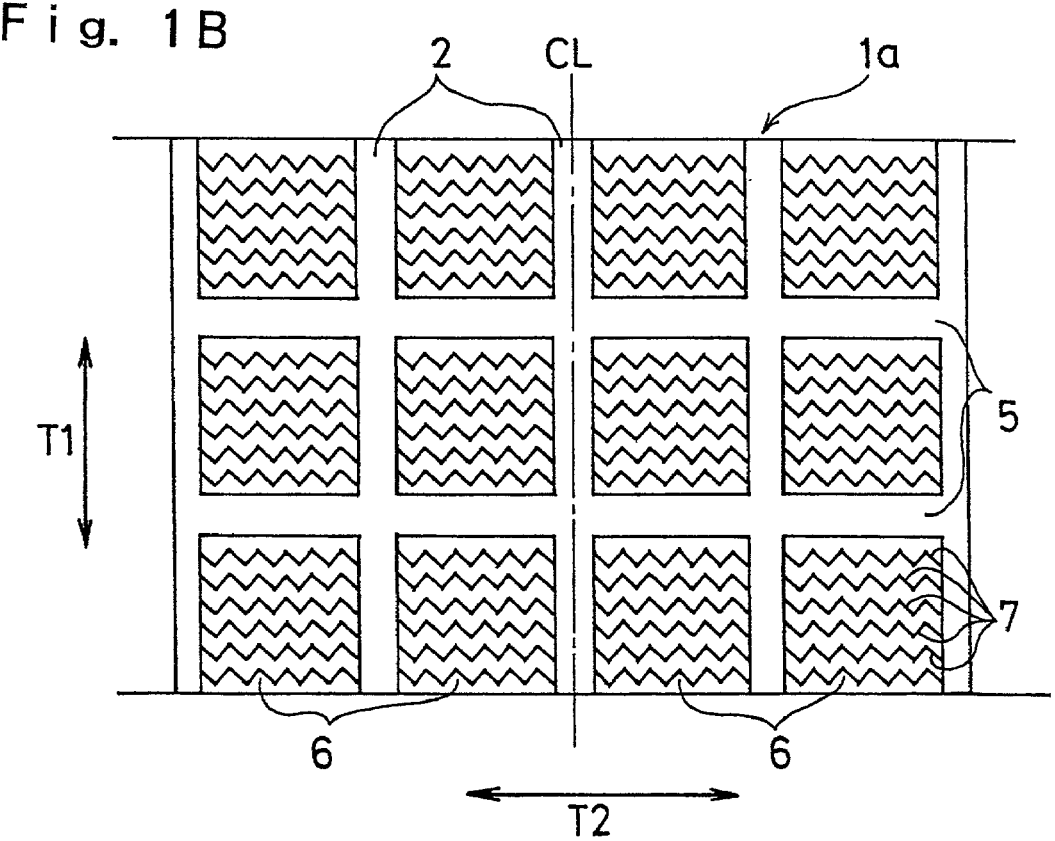
FIG. 1B is a plan view showing a tread face of the pneumatic tire shown in FIG. 1A.

In FIG. 1A and FIG. 1B, reference numeral 1 denotes a tread portion, reference numeral 2 denotes a plurality of main grooves extending in a circumferential direction T1 of a tire, and reference numeral 5 denotes a plurality of sub grooves provided so as to intersect the main grooves 2. A carcass layer 3 is provided inside the tire as a skeleton, and a plurality of belt layers 4 are provided between the carcass layer 3 and the tread portion 1. On a tread face 1a, multiple blocks 6 are partitioned and formed by the main grooves 2 and the sub grooves 5. Reference code CL denotes a center line of the tire.

On a surface of each of the blocks 6, provided are a plurality of zigzag sipes 7 extending in a width direction T2 of the tire. Each of the sipes 7 crosses over the block 6 and communicates with the main grooves 2 on the right and on the left.

Figure 2A:
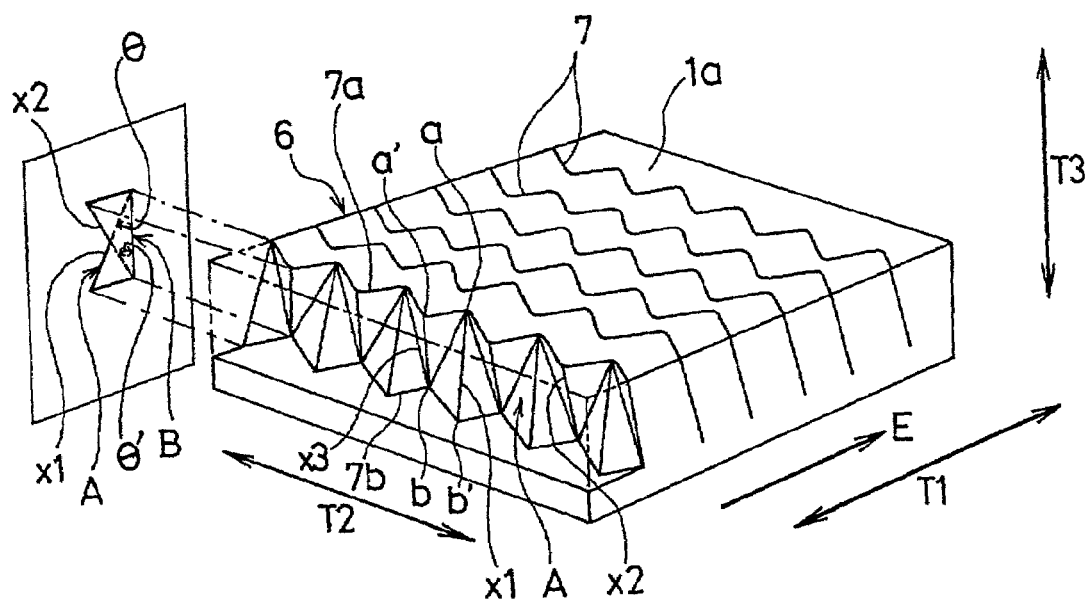
FIG. 2A is a perspective view of a block provided on the tire of the present invention, the view which is partially broken along a sipe thereof and is associated with a projection drawing of a wall surface of the broken sipe.
Figure 2B:
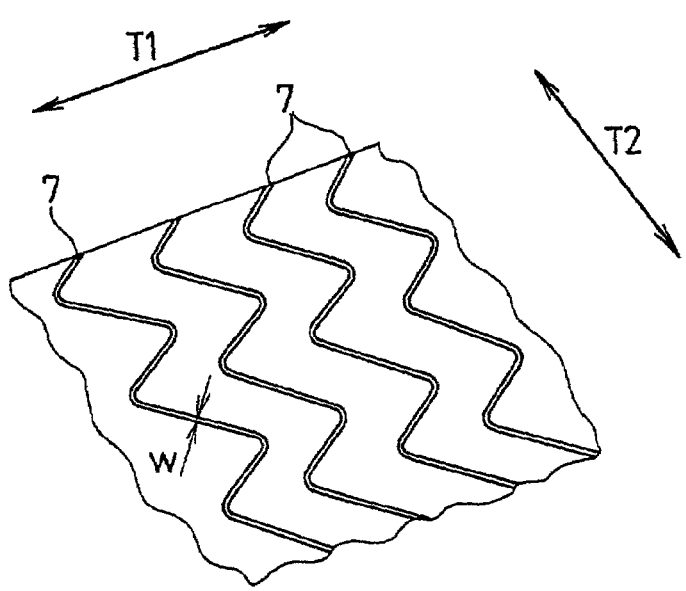
FIG. 2B is an enlarged view of a surface of the block shown in FIG. 2A.

As shown in FIG. 2A, the sipe 7 includes a layout that a zigzag shape at the tread face 1a and a zigzag shape at a bottom are shifted by a half pitch in the width direction of the tire. In addition, spaces between convex flexion points a and b, and concave flexion points a' and b' of the zigzag shape 7a on the tread face 1a side and the zigzag shape 7b on the bottom side (that is, concavity and convexity according to a visual direction E along the circumferential direction of the tire) are connected by edge lines as described later. Note that a relation of concavity and convexity of the zigzag shapes is relative on the other side of the sipe 7. Accordingly, if the convex flexion points a and b are viewed according to a visual direction reverse to the direction E along the circumferential direction of the tire, then the identical convex flexion points a and b appear to be concave flexion points.

Specifically, the sipe 7 is formed in a manner that spaces between the convex flexion points a and the concave flexion points b' facing one another between the zigzag shapes 7a and 7b on the tread face 1a side and on the bottom side, spaces between the concave flexion points a' and the convex flexion points b similarly facing one another, and spaces between the convex points a and b adjacent to one another are severally connected by edge lines x1, x2 and x3, and that spaces between the edge lines x1-x3, x3-x2, x2-x3 and x3-x1 are serially interlocked by planes in the width direction of the tire.

Figure 3A:
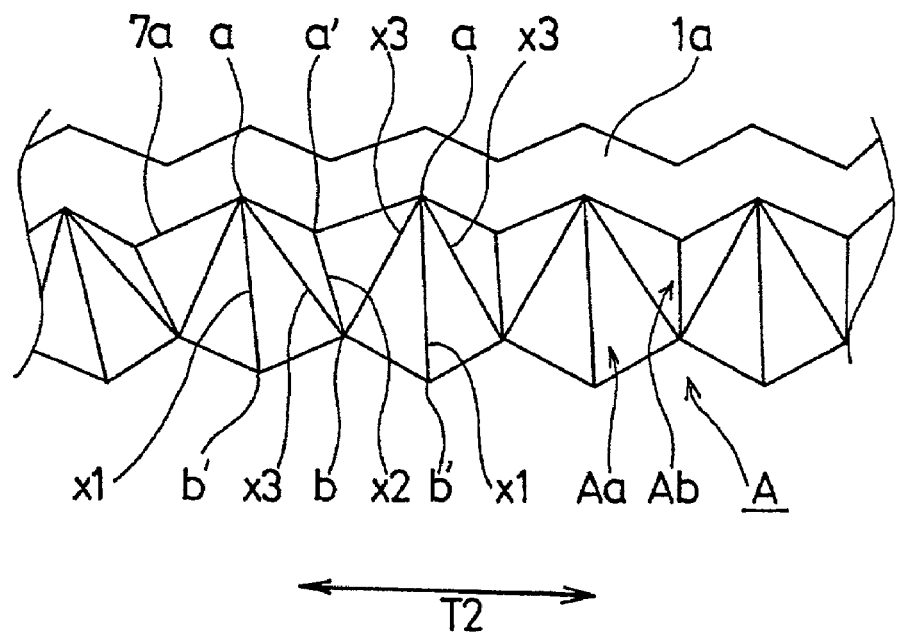
FIG. 3A is an enlarged perspective view of a concavo-convex face A of a wall surface partitioned by a sipe of the block of the tire according to the present invention.
Figure 3B:
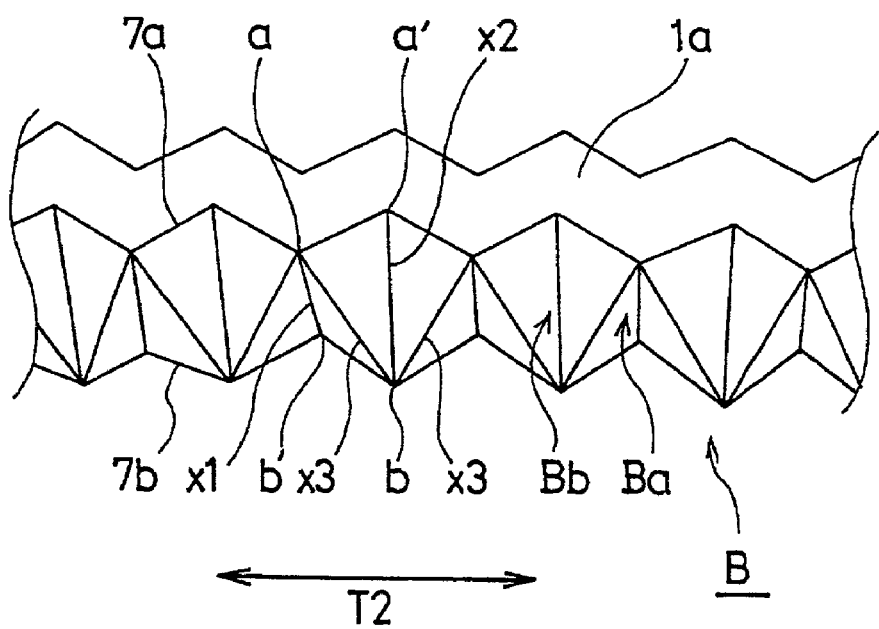
FIG. 3B is an enlarged perspective view of a concavo-convex face B of a wall surface partitioned by the sipe of the block of the tire according to the present invention.

As a result, one of wall surfaces sectioned by the sipe 7 is formed into a concavo-convex face A in which convex triangular pyramids Aa and convex reverse triangular pyramids Ab are alternately arranged in the width direction of the tire as shown in FIG. 3A. Meanwhile, the other wall surface is formed into a concavo-convex face B in which concave triangular pyramids Ba and concave reverse triangular pyramids Bb are alternately arranged in the width direction of the tire as shown in FIG. 3B.

If the sipe 7 in which the concavo-convex face A and the concavo-convex face B are facing each other is projected onto a plane P orthogonal to the width direction extending from the sipe 7, then as shown in FIG. 2A, an inflected outline composed of the edge lines x1 and the edge lines x2 intercrossing in the middle appears on the concavo-convex face A side. On the contrary, an outline perpendicular to the tread face owing to the edge lines x3 appears on the concavo-convex face B side.

A distinctive characteristic between the two concavo-convex faces A and B is a difference in flexural rigidity when friction force in the circumferential direction of the tire is applied to the tread face. In other words, rigidity upon applying flexural force toward the concavo-convex face A side is considerably larger than rigidity upon applying flexural force toward the concavo-convex face B side. It is because the concavo-convex face A has the constitution of arrangement of the convex triangular pyramids Aa and the convex reverse triangular pyramids Ab; meanwhile, the concavo-convex face B has the constitution of arrangement of the concave triangular pyramids Ba and the concave reverse triangular pyramids Bb to the contrary.

Figure 4:
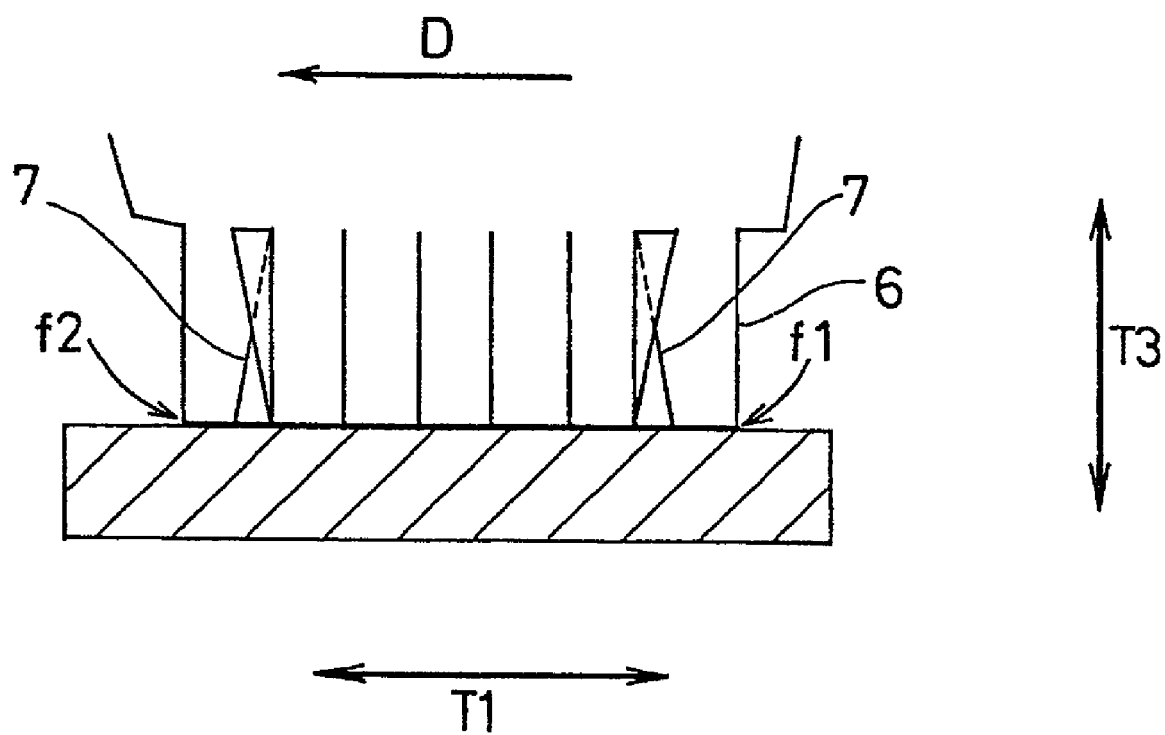
FIG. 4 is an explanatory view for showing an operating state of the block of the tire according to the present invention.

In the tire according to the present invention, upon disposing the sipes 7 of the above-described constitution in the block 6, wall surfaces which are the concavo-convex faces A sectioned by the sipes are disposed at least in both outermost positions in the circumferential direction of the block in a manner that the concavo-convex faces A are oriented outward from the block. Accordingly, as shown in FIG. 4, when a traveling direction is defined as D, the concavo-convex face A at a back end is allowed to generate large flexural rigidity in the block 6 against flexural force f1 owing to friction force being applied from a road surface in the D direction upon driving. Meanwhile, the concavo-convex face A at a front end is allowed to generate large flexural rigidity in the block 6 against flexural force f2 owing to friction force being applied from the road surface in the direction reverse to D direction upon braking. In this way, it is possible to enhance on-ice performances on snowy and icy roads by the large edge effect without degrading driving stability as on dry roads and to suppress occurrence of uneven wear of the tire. In addition, since the wall surfaces of the sipes 7 are structured as described above, sipe-forming blades of a mold possesses sufficient flexural rigidity if the sipe-forming blades are thinned. Accordingly, it is possible to prevent the sipe-forming blades from breaking when the tire is released from the mold after completion of curing.

In the present invention, regarding angles of inclination of the edge lines x1 and x2 which severally connect the convex flexion points and the concave flexion points between the zigzag shapes on the tread face side and the bottom side facing one another, it is preferable to set both of the angles of inclination $\theta$ and $\theta'$ with respect to a direction of diameter of the tire T3 in a range from 10° to 35° when projected onto the plane P orthogonal to the direction extending from the sipe 7 (see FIG. 2A). If the angles of inclination $\theta$ and $\theta'$ are less than 10°, the edge effect of the sipes cannot be gained sufficiently. Therefore, enhancement of rigidity of the block 6 and friction force against road faces cannot be expected. Meanwhile, if the angles of inclination $\theta$ and $\theta'$ are above 35°, then it is difficult to release the tire from the mold after curing.

In addition, it is desirable to set a width w (or a thickness) of the sipe 7 as thin as possible, preferably within 0.5 mm. If the width is set within 0.5 mm, it is possible to further increase flexural resistance of the block 6 partitioned by the sipes when friction force is applied to the tread face in the circumferential direction T1 of the tire. Accordingly, flexural rigidity of the block 6 is further enhanced, thus improving driving force or braking force thereof.

The reason for enabling reduction of the width w of the sipe 7 is because the sipe-forming blade of the mold is formed into a zigzag shape in which triangular pyramids and reverse triangular pyramids are alternately arranged, whereby the sipe-forming blade is provided with enhanced flexural rigidity. However, there is a limitation involved in enhancing the flexural rigidity of the sipe-forming blade, so that preferably the width w of the sipe 7 should be set not smaller than 0.2 mm.

As described above, according to the pneumatic tire of the present invention, one of the wall surfaces sectioned by the sipe is formed into the concavo-convex face A in which the convex triangular pyramids and the convex reverse triangular pyramids are alternately arranged in the width direction of the tire, and the concavo-convex faces A are disposed at least in the both outermost positions in the circumferential direction of the block in the manner that the concavo-convex faces A are oriented outward from the block. Accordingly, flexural rigidity against shearing force applied to the end portions of the block is enhanced upon braking and driving, whereby the edge effect can be increased. In this way, it is possible to enhance on-ice performances on snowy and icy roads without degrading driving stability as on dry roads and to suppress occurrence of uneven wear. In addition, since the wall surfaces of the sipe are structured as described above, it is possible to increase flexural rigidity of the sipe-forming blade of the mold if the blade is thinned, whereby breakage thereof can be eliminated upon releasing the tire from the mold after curing. Moreover, the above-described structure of the sipe can also facilitate release of the tire from the mold.

Embodiments 1 to 5 and comparative examples 1 to 3

Figure 5:
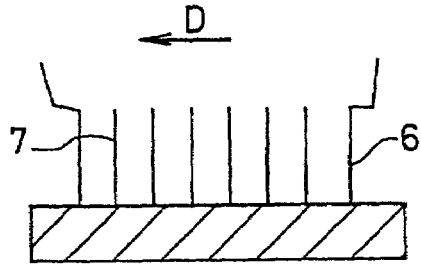
FIGS. 5(a) to 5(c) are explanatory views showing operating states of blocks of pneumatic tires according to comparative examples 1 to 3.
FIGS. 5(d) to 5(h) are explanatory views showing operating states of blocks of pneumatic tires according to embodiments 1 to 5.
Figure 5:
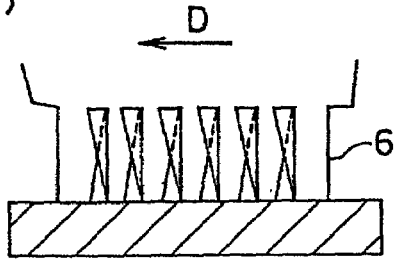
Figure 5:
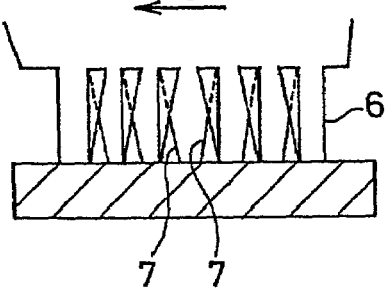
Figure 5:
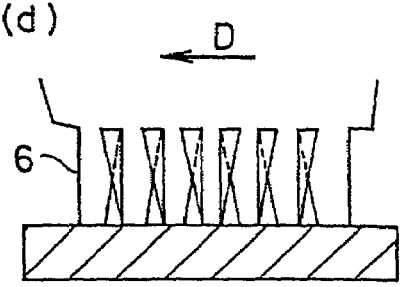
Figure 5:
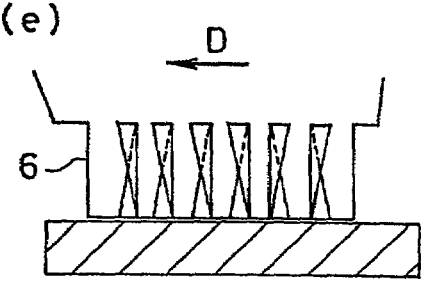
Figure 5:
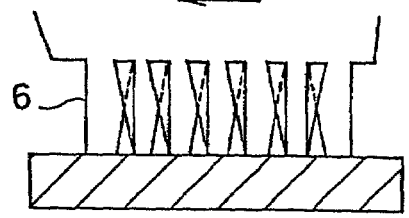
Figure 5:
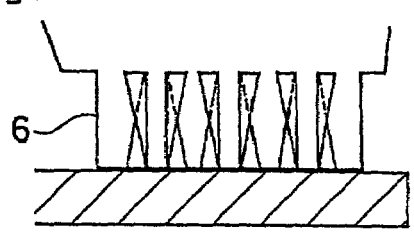
Figure 5:
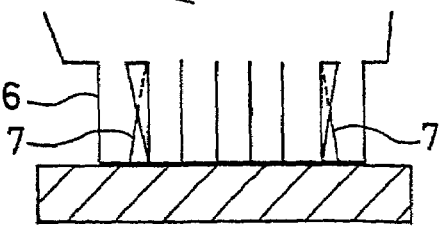

Eight types of pneumatic tires are fabricated according to different sipe types (shapes and arrangements) to be provided on block surfaces as shown in the following Table 1 and as illustrated in FIGS. 5(*a*) to 5(*h*), except for common specifications of a tire size of 185/65R14, a tread pattern as shown in FIG. 1B, six lines of sipes being disposed in each block, and a sipe width of 0.3 mm (embodiments 1 to 5, and comparative examples 1 to 3).

Each of FIGS. 5(*a*) to 5(*h*) shows a contact state of a block of a pneumatic tire. Among the sipes 7 illustrated in these drawings, those indicated by straight perpendicular lines are formed by conventional planar sipe-forming blades, and those indicated by block shapes are formed by the forming blades which partition the sipes into the concavo-convex faces A and B.

The angles of inclination $\hbar$ and $\hbar'$ of the sipes indicated by the block shapes are 20°, respectively.

Table 1 shows results of evaluations of braking performances and driving performances of these 8 types of pneumatic tires respectively fitted to rims of a rim size of 14×6JJ, in which evaluations are conducted in accordance with the following measurement methods under the condition of fitting the pneumatic tires at inflation pressure of 200 kPa to a 1800-cc Japanese domestic front engine-front drive automobile.

Braking Performance Test:

Straight-line braking distances are measured upon braking from a velocity at 40 km/h on an ice-covered test course of ice temperatures in a range from −5° C. to −8° C. and air temperatures in a range from −3° C. to −5° C. Thereafter, measured values are converted into reciprocal numbers and evaluated according to indices defined severally relevant to an index value of 100 regarding the tire of the comparative example 1 as a standard. When the index value is greater, the braking performance is superior.

Driving Performance Test:

Interval times of acceleration from a velocity at 5 km/h to a velocity at 20 km/h are measured on the ice-covered test course of ice temperatures in a range from −5° C. to −8° C. and air temperatures in a range from −3° C. to −5° C. Thereafter, measured interval times are converted into reciprocal numbers and evaluated according to indices defined severally relevant to an index value of 100 regarding the tire of the comparative example 1 as a standard. As the index value is greater, the driving performance is superior.

TABLE 1

|  | Sipe Arrangement Type | Braking Performance Index | Driving Performance Index |
| --- | --- | --- | --- |
| Comparative Example 1 | FIG. 5(a) | 100 | 100 |
| Comparative Example 2 | FIG. 5(b) | 125 | 100 |
| Comparative Example 3 | FIG. 5(c) | 100 | 100 |
| Embodiment 1 | FIG. 5(d) | 123 | 123 |
| Embodiment 2 | FIG. 5(e) | 122 | 115 |
| Embodiment 3 | FIG. 5(f) | 122 | 112 |
| Embodiment 4 | FIG. 5(g) | 118 | 118 |
| Embodiment 5 | FIG. 5(h) | 112 | 112 |

As obvious from Table 1, the tires according to the embodiments 1 to 5 show the superior evaluation results concerning both of the braking performances and the driving performances in comparison with the tire of the comparative example 1 which corresponds to a conventional tire.

What is claimed is:

1. A pneumatic tire including multiple blocks formed on a tread face and defined by and between a plurality of main grooves extending in a circumferential direction of the tire and by and between a plurality of sub grooves intersecting the main grooves, in which zigzag sipes extending in a width direction of the tire are provided on and into surfaces of the blocks, wherein the sipes are formed by shifting pitches of a zigzag shape on a tread face side of the sipe and a zigzag shape on a bottom side thereof in the width direction of the tire, and in the case of viewing concave and convex points according to a visual direction E along the circumferential direction of the tire, connecting a convex flexion point of the zigzag shape on the tread side and a concave flexion point of the zigzag shape on the bottom side which are facing each other, a concave flexion point of the zigzag shape on the tread side and a convex flexion point of the zigzag shape on the bottom side which are facing each other, and the convex points of the both zigzag shapes which are adjacent to each other, severally with edge lines, and interlinking the edge lines serially by planes in the width direction of the tire, wherein one of wall surfaces sectioned by the sipe is formed into a concavo-convex face A in which convex triangular pyramids and convex reverse triangular pyramids are alternately arranged in the width direction of the tire, and the other wall surface is formed into a concavo-convex face B in which concave triangular pyramids and concave reverse triangular pyramids are alternately arranged in the width direction of the tire, wherein a plurality of the concavo-convex faces A sectioned to be adjacent by the sipes are disposed in each of the two outermost positions in the circumferential direction of the block to be oriented outward from the block, and wherein angles of inclination of the edge lines, which severally connect the convex flexion points and the concave flexion points between the zigzag shapes on the tread face side and the bottom side facing one another, with respect to a direction of diameter of the tire are set in a range from 10° to 35° when the edge lines are projected onto a plane orthogonal to a direction extending from the sipe.

2. The pneumatic tire according to claim 1, wherein a width of the sipe is within 0.5 mm.

3. The pneumatic tire according to claim 1, wherein each one of the sipes extends entirely across and through respective ones of the blocks.

4. The pneumatic tire according to claim 3, wherein each one of the sipes effectuate communication between juxtaposed ones of the main grooves partially defining the respective blocks.

* * * * *